United States Patent

Fujimoto et al.

[11] Patent Number: 6,041,905
[45] Date of Patent: Mar. 28, 2000

[54] COIL SPRING ASSEMBLY FOR A LOCK-UP DAMPER

[75] Inventors: Shinji Fujimoto, Hirakata; Masahiro Maeda, Shijounawate, both of Japan

[73] Assignee: Exedy Corporation, Osaka, Japan

[21] Appl. No.: 09/136,359

[22] Filed: Aug. 19, 1998

[30] Foreign Application Priority Data

Sep. 8, 1997 [JP] Japan .................................. 9-243083

[51] Int. Cl.[7] .............................. F16D 3/14; F16D 33/00
[52] U.S. Cl. ........................................ 192/205; 192/3.29
[58] Field of Search .................................. 192/205, 3.29; 464/66, 68; 74/574

[56] References Cited

U.S. PATENT DOCUMENTS

| | | | |
|---|---|---|---|
| 4,891,033 | 1/1990 | Heyser | 192/205 X |
| 4,899,617 | 2/1990 | Kobayashi et al. | 192/205 X |
| 4,950,205 | 8/1990 | Umeyama | 192/205 X |
| 4,959,039 | 9/1990 | Naudin | 192/205 X |
| 5,772,515 | 6/1998 | Yamakawa et al. | 192/205 X |
| 5,810,140 | 9/1998 | Billet et al. | 192/205 X |

*Primary Examiner*—Rodney H. Bonck
*Assistant Examiner*—Roger Pang
*Attorney, Agent, or Firm*—Shinjyu Global IP Counselors, LLP

[57] ABSTRACT

A lock-up damper or clutch 7 of a torque converter 1 is provided with a plurality of coil spring assembly 32 for elastically coupling the piston 22 of the torque converter 1 to a turbine 4 of the torque converter 1. The coil spring assembly 32 basically includes a large coil spring 40 and two spring seats 42. The coil spring assembly 32 is designed to prevent a reduction of the performance of the coil spring 40 and to absorb a torsion vibration in the lock-up damper 7 for the torque converter 1. Each of the spring seats 42 is disposed one of the sides of the large coil spring 40. Each of the spring seats 42 has a seat part 43, a first protrusion 44 and a second protrusion 45. The seat part 43 contacts the end of the large coil spring 40. The first protrusion 44 extending from the seat part 43 and is pressed-fitted into an end turn of the large coil spring 40.

6 Claims, 3 Drawing Sheets

6,041,905

COIL SPRING ASSEMBLY FOR A LOCK-UP DAMPER

BACKGROUND OF THE INVENTION

1. Field of the Invention

The present invention generally relates to a coil spring assembly of an elastic connecting mechanism. More specifically, the present invention relates to a coil spring assembly for a lock-up damper of a torque converter.

2. Background Information

Torque converters usually include a fluid coupling mechanism for transmitting torque between the crankshaft of an engine and the input shaft of an automatic transmission. In recent years, to improve fuel efficiency, some torque converters have included a lock-up device that, upon reaching predetermined operating conditions, lock-up the torque converters so that power from the crankshaft of an engine is directly transmitted to the automatic transmission, bypassing the fluid coupling device. Upon engagement, lock-up devices often cause a shudder, or vibration. Further, while engaged, the lock-up device is subject to vibrations caused by sudden acceleration, or deceleration, or other vibration including circumstances associated with internal combustion engines. Consequently, torsional vibration dampening apparatus' are typically employed in lock-up mechanisms to dampen vibration.

A torque converter has three types of runners (impeller, turbine, stator) located inside for transmitting the torque by means of an internal hydraulic oil or fluid. The impeller is fixedly coupled to the front cover that receives the input torque from the power input shaft. The hydraulic chamber formed by the impeller shell and the front cover is filled with hydraulic oil. The turbine is disposed opposite the front cover in the hydraulic chamber. When the impeller rotates together with a front cover, the hydraulic fluid flows from the impeller to the turbine, resulting in a rotation of the turbine. As a result, a torque from the turbine is transmitted from the turbine to the main drive shaft of the transmission.

The lock-up clutch or lock-up damper has a clutch function to connect or disconnect the front cover, and a dampening function to absorb and attenuate torsional vibration included within torque. When the lock-up clutch is connected, torque is transmitted to the turbine mechanically, not via the hydraulic fluid. The lock-up clutch is disposed in the space between the front cover and the turbine. As mentioned above, the lock-up clutch is a mechanism to directly transmit the torque between the crankshaft of the engine and the drive shaft of the transmission by mechanically coupling the front cover and the turbine together.

The lock-up clutch primarily includes a piston and an elastic coupling mechanism (dampening mechanism) to connect the piston to the drive members on the power output side of the turbine. The piston is a disk-shaped member, which is axially movable within the torque converter. The piston is disposed in the space between the front cover and the turbine to divide the space into a first hydraulic chamber on the front cover side and a second hydraulic chamber on the turbine side. As a result, the piston can move close to and away from the front cover in response to the pressure difference between the first hydraulic chamber and the second hydraulic chamber. A friction joining member covered with a friction facing is formed on the axial surface of the front cover which faces the piston. Preferably, the friction facing is located at the outer periphery of the axial surface of the cover. When the lock-up clutch is engaged, the hydraulic oil in the first hydraulic chamber is drained from its inner circumferential side of the torque converter and the hydraulic oil is supplied to the second hydraulic chamber. As a result, the hydraulic pressure in the second hydraulic chamber becomes greater than the hydraulic pressure in the first hydraulic chamber. This pressure differential between the first and second hydraulic chambers causes the piston to move toward the front cover of the torque converter such that the piston engages the cover. This movement of the piston causes the friction facing of the piston to strongly press against the friction surface or facing of the front cover.

The elastic coupling mechanism of the lock-up clutch functions as a torsional vibration dampening mechanism to dampen vibrations in the lock-up clutch. The elastic coupling mechanism includes, for example, a drive member or retaining plate fixedly coupled to the piston, a driven member fixedly coupled to the turbine, and an elastic member, such as one or more coil springs, disposed in between the drive member and the driven member to enable torque transmission therebetween.

A spring seat is disposed at each end of the coil springs in the circular direction. The spring seat typically includes a seat part and a protrusion. The seat part includes a first face with which the end of the coil spring is in contact, and a second face, which is in contact with the connecting parts of the retaining plate and the driven plate. The protrusion extends from the seat part of the spring into the inside of the coil spring.

In the elastically coupling mechanism of the above mentioned conventional lock-up device, a gap is formed between the protrusion of the spring seat and the inner diameter of the coil spring. Thus, the spring seat can move freely against the coil spring owing to the gap.

Therefore, the following problems often occur in the above mentioned conventional lock-up device. When torsional vibration is inputted in the lock-up device, the coil spring repeats a motion of compression and recovery in a circular direction. Since the spring seats can move freely against the coil spring, the motions of the spring seats and the coil spring tend to be unstable when torsional vibration is transmitted during an ultra high speed or an ultra high load. As the result, the performance of the coil spring to absorb a vibration is reduced.

In view of the above, there exists a need for coil spring assembly which overcomes the above mentioned problems in the prior art. This invention addresses this need in the prior art as well as other needs, which will become apparent to those skilled in the art from this disclosure.

SUMMARY OF THE INVENTION

An object of the present invention is to prevent a reduction of the performance of a coil spring to absorb torsional vibration in a lock-up damper for a torque converter.

A coil spring assembly in accordance with the present invention is used for a lock-up damper of a torque converter. The coil spring assembly includes a coil spring and two spring seats. Each of the spring seats is disposed on either side of the coil spring, and includes a seat part contacting the end of the coil spring, and a column like protrusion extending from the seat part. The column like protrusion is pressed into an end turn of the coil spring for fixedly coupling the spring seat to the coil spring.

In a coil spring assembly in accordance with the present invention, when a torsion vibration is being transmitted, the coil spring repeats following motions. The coil spring is compressed between a drive portion and a driven portion in the circular direction, and then de compresses to return back to its original length from the compressed length. At that time, since the protrusions of the spring seats are pressed in the end turns of the coil spring, the motion of the coil spring coincides with the motions of the spring seats. This simultaneous movement of the spring seats with the coil spring results in the prevention of the reduction of the performance of the coil spring to absorb a torsional vibration.

In a coil spring assembly in accordance with one aspect of the present invention, the length of the protrusion of the spring seat is within a range of approximately 0.5 to approximately 2 times of the wire diameter of the coil spring. In a coil spring assembly of the present invention, since the length of the protrusion of the spring seat is suitable, the excellent performance can be obtained. When the protrusion of the spring seat is long too much compared with the wire diameter of the coil spring, the motion of the coil spring is restricted. When the protrusion of the spring seat is short too much compared with the wire diameter of the coil spring, there is a high possibility that the coil spring disengage from or pop out of the protrusion of the spring seat.

In a coil spring assembly in accordance with another aspect of the present invention, the length of the protrusion of the spring seat is within a range of approximately 0.75 to approximately 1.25 times of the wire diameter of the coil spring. In a coil spring assembly in accordance with the present invention, since the ratio of the length of the protrusion to the wire diameter of the coil spring is set to be suitable, more excellent effect is obtained.

In a coil spring assembly in accordance with another aspect of the present invention, the length of the protrusion of the spring seat is substantially equal to the wire diameter of the coil spring. In a coil spring assembly of the present invention, since the ratio of the length of the protrusion of the spring seat to the wire diameter of the coil spring is set to be within a suitable range, more excellent effect is obtained.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
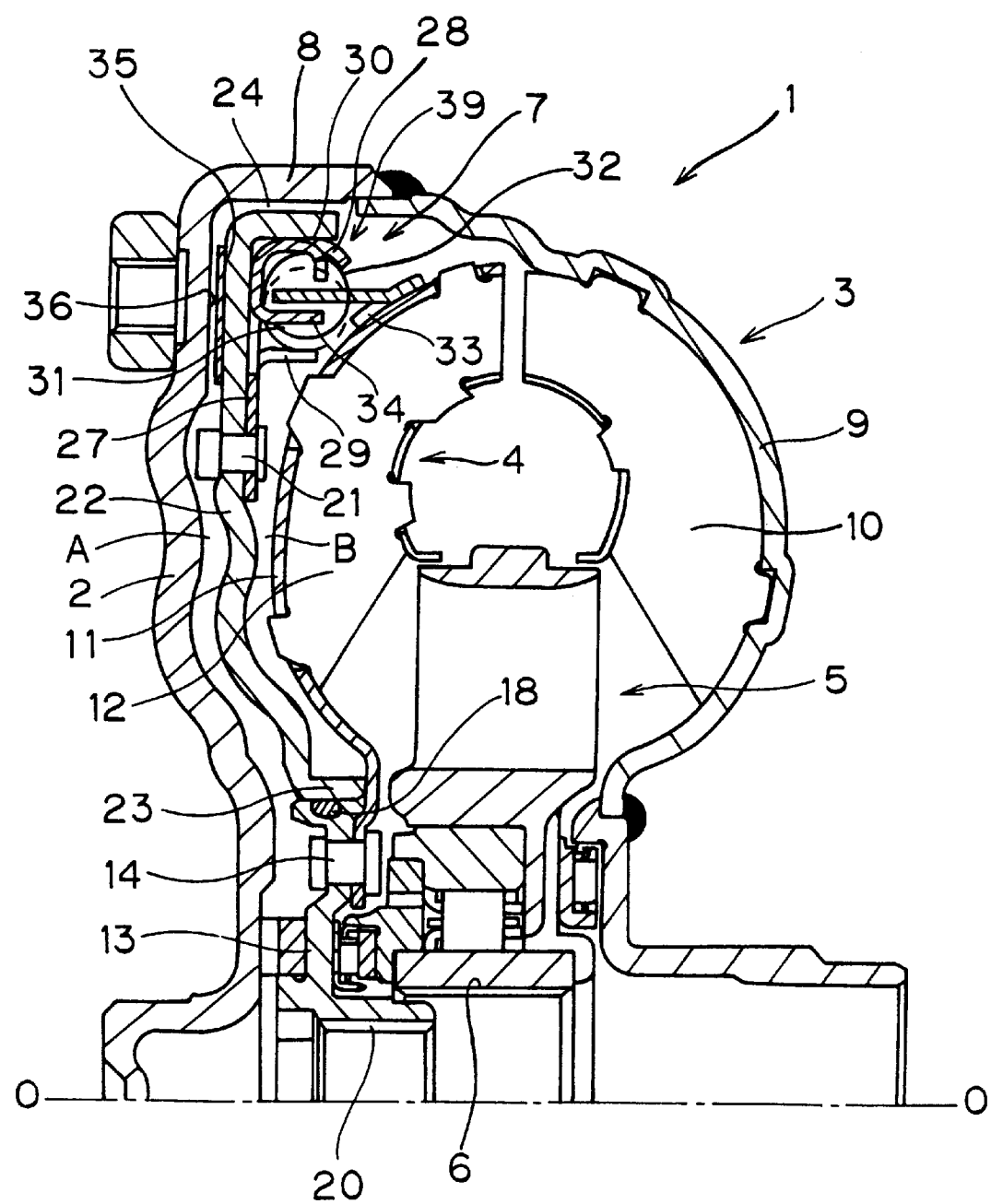
FIG. 1 shows a partial cross-sectional view of a torque converter in accordance with one preferred embodiment of the present invention.

Referring initially to FIG. 1, a torque converter 1 is illustrated in accordance with one embodiment of the present invention. The torque converter 1 is especially useful in motor vehicles. In particular, the torque converter 1 is a mechanism for transmitting torque from a crankshaft (shown in broken lines) and a main drive shaft (shown in broken lines) of a transmission (not shown). The engine is positioned to the left of the torque converter 1 as viewed in FIG. 1, while the transmission is positioned to the right of the torque converter 1 as viewed in FIG. 1. Centerline O—O in FIG. 1 represents the axis of rotation of the torque converter 1.

As shown in FIG. 1, the torque converter 1 basically includes a front cover 2, a converter main body and a lock-up damper or clutch 7. The converter main body basically includes three main turbine elements, namely, an impeller 3, a turbine 4, a stator 5 and piston 22. The front cover 2 located on the input side of the torque converter 1. The torque converter 1 forms a hydraulic chamber with the front cover 2 and the impeller 3. The turbine 4 is located opposite the impeller 3 within the hydraulic fluid chamber. The stator 5 is disposed between the impeller 3 and the turbine 4. The piston 22 is disposed so as to divide the space between the front cover 2 and the turbine 4 into a first hydraulic chamber A and a second hydraulic chamber B. The piston 22 can approach and leave the front cover 2 according to the differential pressure between the first and second hydraulic chambers A and B.

In particular, the impeller 3 is constructed from the impeller shell 9 and the impeller plates 10. The impeller shell 9 is fixedly coupled to the outer projection 8 of the front cover 2. The front cover 2 can be installed to the structural components of the engine, which are not shown, so that the torque from the engine is transmitted to the front cover 2. A plurality of impeller blades 10 is fixedly coupled to the interior of the impeller shell 9. The turbine 4 is disposed at the position opposite the impeller 3 in the hydraulic chamber. The turbine 4 is constructed from the turbine shell 11 and the plurality of turbine blades 12. The turbine blades 12 are fixedly coupled to the surface of turbine shell 11. The inner periphery of the turbine shell 11 is fixedly coupled to the flange 15 of the turbine hub 13 by the rivets 14. The turbine hub 13 has a central bore with a plurality of spline grooves 20 for coupling the main drive shaft (shown in broken lines) of the transmission to its interior.

The stator 5 is disposed between the radially inside of the impeller 3 and the interior of the turbine 4. The stator 5 controls the direction of the hydraulic oil returned from the turbine 4 to the impeller 3 to regulate a torque ratio. The stator 5 is supported on a fixed shaft, not shown, extending from the transmission by the one-way clutch 6.

The lock-up damper or clutch 7 is disposed in the space between the front cover 2 and the turbine 4. The lock-up clutch 7 is a structure for mechanically coupling the front cover 2 to the turbine 4. The lock-up damper or clutch 7 primarily includes a piston 22 and an elastic coupling mechanism 39 for elastically coupling the piston 22 to the turbine 4.

The piston 22 is a disk-shaped member, which is disposed in the hydraulic chamber of torque converter 1. The piston 22 divides the space between the front cover 2 and the turbine shell 11 into a first hydraulic chamber A on the front cover 2 side and a second hydraulic chamber B on the turbine 4 side. The piston 22 is preferably constructed of a thin metal plate. As shown in FIG. 1, the piston 22 has an inner tubular or cylindrical portion 23 and an outer tubular or cylindrical portion 24. The inner tubular portion 23 of piston 22 extends toward the transmission side of the torque converter at its inner circumferential portion.

Figure 2:
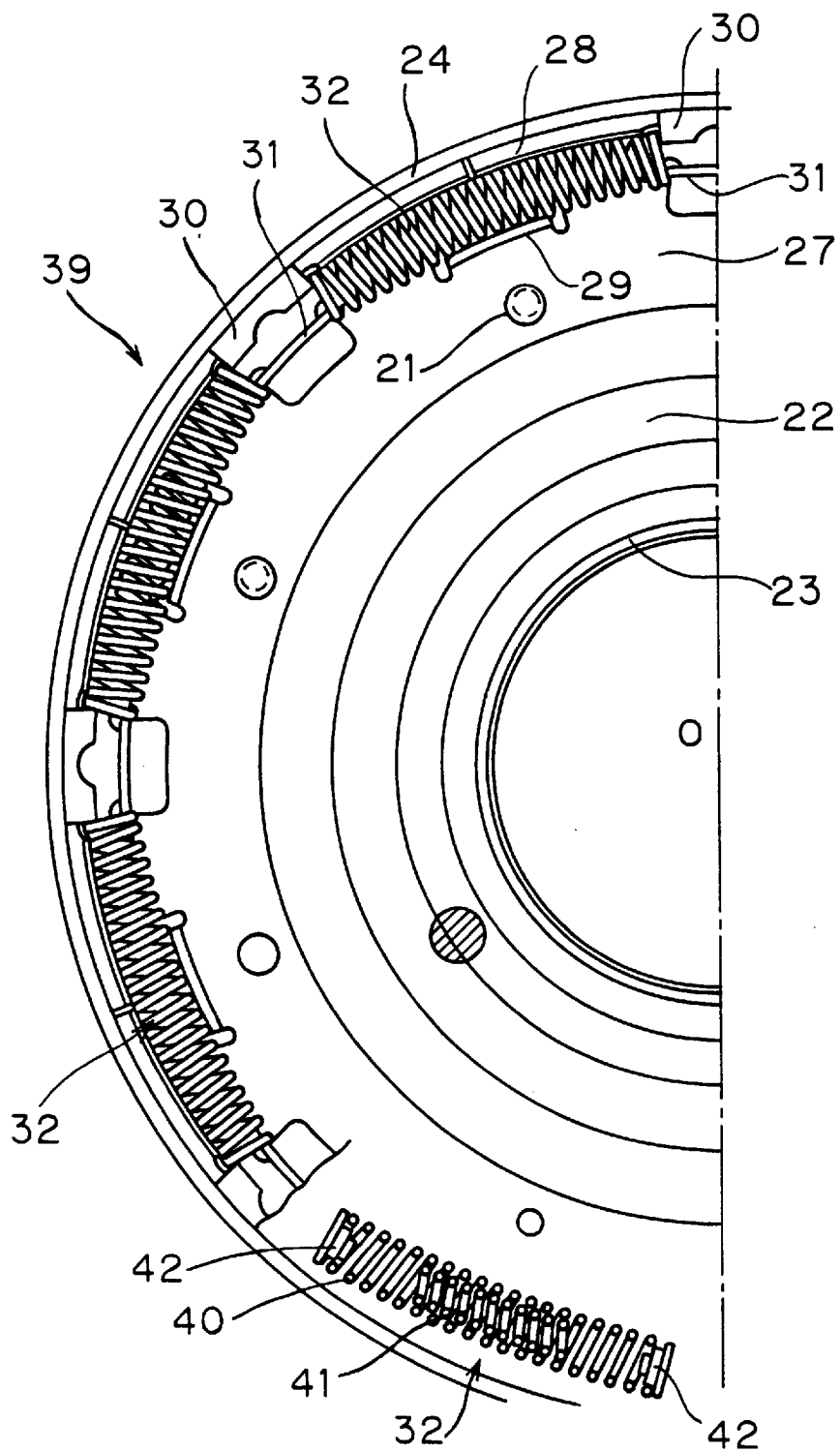
FIG. 2 is an enlarged partial elevational view of a portion of the lock-up device of the torque converter illustrated in FIG. 1 in accordance with one embodiment of the present invention.

As shown in FIG. 2, the inner tubular portion 23 of piston 22 is supported to allow relative motion in the axial direction and the circumferential direction on the outer surface of the flange of the turbine hub 13. In particular, the tubular portion 23 of piston 22 is movably supported on the outer circumferential face 19 of a cylinder-like part so as to be movable relatively in axial and circular directions. The cylinder-like part is formed at the most outer circumference of the flange of the turbine hub 13. In other words, the inner circumferential surface of the inner the inner tubular portion 23 of piston 22 contacts the outer circumferential face 19 of the cylinder-like part. An annular channel is formed at the axially median position of the outer circumferential face of the cylinder-like part of the turbine hub 13.

A seal ring 18 is disposed between the inner tubular portion 23 of piston 22 and the flange of the turbine hub 13. In particular, the seal ring 18 is located in a groove or channel formed on the outer surface of the flange of the turbine hub 13 for sealing the inner peripheries of the first hydraulic chamber A and the second hydraulic chamber B. In other words, the seal ring 18 contacts the inner circumferential surface of the inner tubular portion 23 of piston 22. Thus, the seal ring 18 seals the inner circumference of the first hydraulic chamber A and the second hydraulic chamber B.

At the outer circumference of the piston 22, an outer tubular portion 24 of the piston 22 is formed. The outer tubular portion 24 of the piston 22 extends axially towards the transmission side of the torque converter 1. The outer circumference of the piston 22 on the engine side is covered with an annular friction facing 35 (friction connecting part). The friction facing 35 is opposite an annular flat friction surface, which is formed at the outer circumference of the front cover 2. The connection between the friction facing 35 and the friction surface of the front cover 2 seals the outer circumferences of the first hydraulic chamber A and the second hydraulic chamber B.

The elastic coupling mechanism 39 (part of the lock-up damper or clutch 7) is disposed between the piston 22 and the turbine 4. More specifically, the elastic coupling mechanism 39 is disposed between the outer peripheral portion of the piston 22 and the outer peripheral portion of the turbine shell 11. The elastic coupling mechanism 39 basically includes a retaining plate 27 as a part of the drive member, a driven plate 33 as a part of the driven member, and a plurality of coil spring assemblies 32, which are disposed between both the plates 27 and 33. The retaining plate 27 is an annular plate member, which is disposed on the transmission side of the outer peripheral portion of the piston 22. Specifically, the retaining plate 27 is disposed on the inner periphery of the outer tubular portion 24. The interior of the retaining plate 27 is fixedly coupled to the piston 22 by a plurality of rivets 21. The retaining plate 27 not only holds the coil spring assemblies 32 but also transmits the torque by engaging both ends of the coil spring assemblies 32 in the circumferential direction. The retaining plate 27 has the holders or retaining parts 28 and 29, which respectively support the radially outer and inner circumferential sides of the plurality of coil spring assemblies 32 such that the coil spring assemblies 32 are arranged in the circumferential direction. The holders 29 are formed by cutting a portion of the retaining plate 27 on the inner circumference side of the coil spring assemblies 32 and then bending a disk-like part out of the plane of the retaining plate 27 so as to extend in an axial direction.

Furthermore, the retaining plate 27 has coupling members 30 and 31 to support both ends of each of the coil spring assemblies 32 in the circumferential direction. The coupling members 30 and 31 are formed by cutting a portion of the retaining plate 27 at the ends of the coil spring assemblies 32 and then bending a disk-like part out of the plane of the retaining plate 27 so as to extend in an axial direction.

The driven plate 33 is an annular plate, which is fixedly coupled to the outer surface of the turbine shell 11. The driven plate 3 has a plurality of tine parts or claws 34 extending axially therefrom towards the engine side of the torque converter 1. The claws 34 are spaced apart from each other in the circumferential direction on the driven plate 33. The claws 34 engage both ends of each of the coil spring assemblies 32 in the circumferential direction. Therefore, the torque from the retaining plate 27 is transmitted to the driven plate 33 through the coil assemblies 32.

Each coil spring assembly 32 includes a large coil spring 40, a small coil spring 41 and a pair of spring seats 42. The small coil spring 41 of each coil spring assembly 32 is disposed within the large coil spring 40 of each coil spring assembly 32. In other words, the outer diameter of the small coil spring 41 is smaller than the inner diameter of the large coil spring 40. In addition, the length of the small coil spring 41 in the circular direction is smaller than that of the large coil spring 40 in the circular direction. Thus, the small coil spring 41 is movable in the circular direction within the large coil spring 40.

The spring seat 42 is disposed on both ends of the large and small coil springs 40 and 41 in the circular direction. A pair of spring seats 42 is used as support members to support the ends of the large and small coil springs 40 and 41 in the circular direction. Each of the spring seats 42 is composed of mainly a seat part 43, a first protrusion member or part 44 projecting from the seat part 43, and a second protrusion member or part 45 projecting from the first protrusion 44. A first face 47 of the seat part 43 contacts one of the ends of the large coil spring 40. A second face 48 of the seat part 43 contacts connecting parts 30 and 31 and the claw part 34. The first protrusion 44 is a column shaped member, which extends from a center of the first face 47 of the seat part 43 along the center of the large coil spring 40. The second protrusion 45 is also a column shaped member, but which extends from a center of the first protrusion 44 along the center of the large coil spring 40. The diameter of each part of the spring seats 42 becomes progressively smaller in the order of the seat part 43, the first protrusion 44 and the second protrusion 45.

The first protrusion 44 is pressed in an end turn (one turn at the end part) of the large coil spring 40. In other words, the end turn of the large coil spring 40 is slightly expanded by the first protrusion 44 such that the spring seat 42 is firmly connected to the large coil spring 40 by press-fitting the first protrusion 44 into the end of the large coil spring 40. As mentioned above, the end parts of the large coil spring 40 are fixedly coupled to a pair of the spring seats 42.

Figure 3:
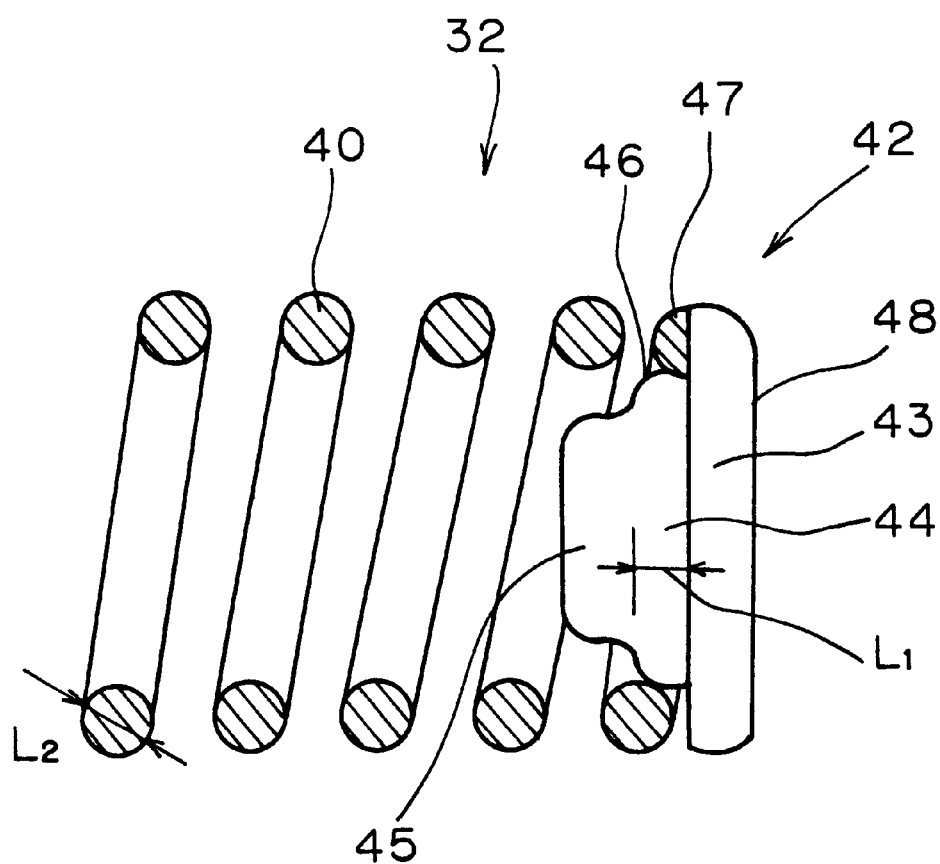
FIG. 3 is an enlarged partial cross-sectional view of a portion of the coil spring assembly illustrating the connection between the coil spring and one of the spring seats.

Referring now to FIG. 3, the length L1 of the first protrusion 44 is preferably substantially equal to a wire diameter L2 of the large coil spring 40. The term "substantially equal" in this context means that any difference between the length L1 and the wire diameter L2 is within the acceptable tolerance of the large coil spring 40. In other embodiments, the length L1 of the first protrusion 44 is preferably within a range of approximately 0.5 to approximately 2.0 times that of the wire diameter L2 of the large coil spring 40. More preferably, the length L1 of the first protrusion 44 is preferably within a range of approximately 0.75 to approximately 1.25 times that of the wire diameter L2 of the large coil spring 40. Most preferably, the length L1 of the first protrusion 44 is preferably equal to or substantially equal to the wire diameter L2 of the large coil spring 40 as mentioned above.

When the length L1 of the first protrusion 44 is too large compared with the wire diameter L2 of the large coil spring 40, the second turn of the large coil spring 40 sometimes hits the first protrusion 44 during operation of the torque converter 1. Thus, the torsional motion of the coil spring assemblies 32 is restricted. In addition, when the length L1 of the first protrusion 44 is too small compared with the wire diameter L2 of the large coil spring 40, the end turn of the large coil spring 40 can easy become disengaged from the spring seat 42. When the spring seat 42 becomes disengaged the large coil spring 40, the press-fitting of the first protrusion 44 in the end turn of the large coil spring 40 becomes useless.

The corner part of the first protrusion 44 is preferably a smoothly curved surface 46. Due the curvature of the surface 46, the end turn or the second end turn of the large coil spring 40 can not cause damage to the surface 46, even if the end turn or the second end turn of the large coil spring 40 contacts the surface 46.

Due to the presence of the second protrusion 45, the spring seat 42 is hard to get out of the large coil spring 40 completely, even if the end turn gets out of the first protrusion 44 because of abrasion of the spring seat 42.

The operation of the torque converter 1 will now described as follows. When torque is transmitted from the engine to the front cover 2, the impeller 3 rotates together with the front cover 2. As the result, hydraulic fluid flows from the impeller 3 to the turbine 4, resulting in a rotation of the turbine 4. The torque of the turbine 4 is then transmitted to a main drive shaft which is not shown in the Figures.

The operation of the lock-up clutch or damper 7 will now be described as follows. A hydraulic fluid in the first hydraulic chamber A is drained from its inner circumference and the hydraulic fluid is supplied to the second hydraulic chamber B. Consequently, the hydraulic pressure increases in the second hydraulic chamber B, while the hydraulic pressure decreases in the first hydraulic chamber A. As the result, the piston 22 moves toward the engine side and the friction facing 35 is pressed strongly against the friction surface 36 of the front cover 2. This results in the transmission of the torque from the front cover 2 to the turbine 4 via the lock-up clutch or damper 7. Within the lock-up clutch or damper 7, the torque transmitted to the piston 22 is transmitted to the turbine 4 via the retaining plate 27, the coil spring assemblies 32 and the driven plate 33. During engagement of the lock-up clutch or damper 7, the connecting parts 30 and 31 of the retaining plate 27 push against one of the spring seats 42 and one ends of the large and small coil springs 40 and 41 in the circular direction, which in turn causes the other ends of the coil springs 40 and 41 and the other spring seat 42 to push against the tine part or claws 34 of the driven plate 33 in a circular direction.

When torque vibration is input in the lock-up clutch or damper 7, the large and small coil springs 40 and 41 of each of the coil spring assemblies 32 repeat the motion of compression and recovery in the circular direction between the retaining plate 27 and the driven plate 33. As the result, the coil spring assemblies 32 absorbs and cut off the torsion vibration.

When the torsional vibration is transmitted, the large coil springs 40 and the spring seats 42 move in a circular direction in a similar manner because they are fixedly coupled to each other by press-fitting. Consequently, even if the large coil springs 40 are twisted by a torsion vibration during a high speed rotation or ultra high load, the motion of the large coil springs 40 and the spring seats 42 are stable. Moreover, the performance of the coil spring assemblies 32 to absorb vibrations is hardly lowered. In addition, since the large coil springs 40 and the spring seats 42 are fixed in a simple way, i.e., by press-fitting, the strength of the large coil spring 40 is hardly reduced. In coil spring assemblies 32 in accordance with the present invention, a protrusions of the spring seats 42 are pressed into the end turns of the large coil springs 40, the coil springs 40 and the spring seats 42 moves together when torsion vibrations are inputted. Consequently, the performance of the coil spring assemblies 32 to absorb vibration is hardly reduced.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A coil spring assembly used for a lock-up damper of a torque converter, said coil spring assembly comprising:
    a coil spring having a predetermined wire diameter with a plurality of wire turns forming a first longitudinal end and a second longitudinal end;
    a first spring seat including a first seat part, a first protrusion section and a second protrusion section, said first seat part being disposed on said first longitudinal end of said coil spring such that said first longitudinal end of said coil spring is in contact therewith, said first protrusion section extending from said first seat part and having a transverse width sized to fixedly engage an end turn of said first longitudinal end of said coil spring, said second protrusion section having a smaller width than said width of said first protrusion section such that a first convexly curved corner surface is formed between said first protrusion section and said second protrusion section; and
    a second spring seat including a second seat part, a third protrusion section and a fourth protrusion section, said second seat part being disposed on said second longitudinal end of said coil spring such that said second longitudinal end of said coil spring is in contact therewith, and said third protrusion section extending from said second seat part and having a transverse width sized to fixedly engage an end turn of said second longitudinal end of said coil spring, said fourth protrusion section having a smaller width than said width of said third protrusion section such that a second convexly curved corner surface is formed between said third protrusion section and said fourth protrusion section,
    each of said first and third protrusion sections has a length within a range of approximately 0.5 to approximately 2.0 times said wire diameter of said coil spring.

2. A coil spring assembly for a lock-up damper as set forth in claim 1, wherein
    each of said first and third protrusion sections has a length within a range of approximately 0.75 to approximately 1.25 times said wire diameter of said coil spring.

3. A coil spring assembly for a lock-up damper as set forth in claim 1, wherein
    each of said first and third protrusion sections has a length which is substantially equal to said wire diameter of said coil spring.

4. A torque converter for transmitting torque from a power input shaft to an output shaft, said torque converter, comprising;

a front cover being adapted to be coupled to the power input shaft;

an impeller connected to said front cover to form a hydraulic chamber with said front cover;

a turbine disposed opposite said impeller and disposed inside said hydraulic chamber, said turbine being adapted to be coupled to the output shaft;

a stator disposed between said impeller and said turbine;

a piston disposed between said front cover and said turbine to form a first hydraulic chamber located between said piston and said front cover and a second hydraulic chamber located between said piston and said turbine, said piston being configured to move close to and away from said front cover by a fluid pressure difference between said first and second hydraulic chambers, said piston having a friction connecting part close to said front cover; and a lock-up damper coupled between said piston and said turbine, said lock-up damper having an elastic coupling mechanism which permits limited rotational movement between said piston and said turbine, said elastic coupling mechanism including a coil spring having a predetermined wire diameter with a plurality of wire turns forming a first longitudinal end and a second longitudinal end;

a first spring seat including a first seat part, a first protrusion section and a second protrusion section, said first seat part being disposed on said first longitudinal end of said coil spring such that said first longitudinal end of said coil spring is in contact therewith, said first protrusion section extending from said first seat part and having a transverse width sized to fixedly engage an end turn of said first longitudinal end of said coil spring, said second protrusion section having a smaller width than said width of said first protrusion section such that a first convexly curved corner surface is formed between said first protrusion section and said second protrusion section; and a second spring seat including a second seat part, a third protrusion section and a fourth protrusion section, said second seat part being disposed on said second longitudinal end of said coil spring such that said second longitudinal end of said coil spring is in contact therewith, and said third protrusion section extending from said second seat part and having a transverse width sized to fixedly engage an end turn of said second longitudinal end of said coil spring, said fourth protrusion section having a smaller width than said width of said third protrusion section such that a second convexly curved corner surface is formed between said third protrusion section and said fourth protrusion section, each of said first and third protrusion sections has a length within a range of approximately 0.5 to approximately 2.0 times said wire diameter of said coil spring.

5. A torque converter for transmitting torque as set forth in claim 4, wherein each of said first and third protrusion sections has a length within a range of approximately 0.75 to approximately 1.25 times said wire diameter of said coil spring.

6. A torque converter for transmitting torque as set forth in claim 4, wherein each of said first and third protrusion sections has a length which is substantially equal to said wire diameter of said coil spring.

* * * * *